United States Patent Office.

ALOIS PÖHR VON PÖHRNHOFF, OF BROOKLYN, NEW YORK.

Letters Patent No. 64,385, dated April 30, 1867.

IMPROVED PROCESS IN THE MANUFACTURE OF BI-CARBONATE OF SODA.

*The Schedule referred to in these Letters Patent and making part of the same.*

---

Be it known that I, ALOIS PÖHR VON PÖHRNHOFF, of the city of Brooklyn, in the county of Kings, in the State of New York, have invented a new and improved Process in Manufacturing Bi-carbonate of Soda; and I do hereby declare that the following is a full and exact description thereof.

The nature of my invention consists in such a process of manufacturing bi-carbonate of soda by which the following advantages will be secured, viz, a greatly simplified manipulation; a product which, as for its chemical as well as mercantile quality, will not have to shun the competition with any English or other similar article brought into the market, while it will yield a greater profit to the manufacturer than bi-carbonate of soda made after the usual *modus operandi*. Such, at least, have been the results of my own researches, comparisons, and practical experiments, based upon a well-sifted experience gathered during twenty years of actual employment as a practical chemist and manager of extensive trans and cisAtlantic establishments.

In all the principal modes of manufacturing bi-carbonate of soda crystallized sal soda has played a prominent part, and does so still; and manifold and various as the endeavors had been (as I myself had endeavored) in finding out a process which may lead on a different and more satisfactory road to the same purpose, always the admixture of crystal soda had been found to be the best means of producing a bi-carbonate product of thoroughly good quality. But, as everybody skilled in the art may be aware of, soda crystallizes only under low temperature, so that the manufacturing of the same is limited to only about three months of the whole year. As a consequence of this, follows, therefore, that the quantity of crystallized produce needed in manufacturing of bi-carbonate of soda all the year through has to be made and stored up in advance of a manufacturing campaign of eight to nine months, an item of no little importance within the compass of the financial questions of a concern. Thus I am led to think that if my process would even not save the time and labor which it does by its simplification, it would be worth the highest consideration already in regard to its enabling considerable funds which had been hidden in slowly winding up stocks of raw material to be surrendered to actual employment and benefits in other directions.

To enable those skilled in the art to understand and use my invention, I shall now proceed in describing the same.

It will be known that in the process of vaporing off solutions of soda ash, hydrate of soda is continually precipitating, which according to the usual *modus operandi* is collected, dried, mixed with crystal soda, and then charged with carbonic gas for the purpose of the bi-carbonating end-result. Some chemists have manipulated said hydrate as such, "refined" and "charged" the same, but, as mentioned already, have always returned to the admixture of crystal (or sal) soda, the new process showing no prominent advantages above the latter usual one. Employing the carbonic (dry) gas alone would not perform the metamorphosis into bi-carbonate, as desired, and calling water to the aid in a manner as done heretofore would complicate and retard the process, thus, as such has always happened, restore the crystal soda to its former importance again. But I simply take the hydrate of soda, gained as mentioned above, and expose it as such, (charged it with,) without submitting it to any previous procedure, to the currents of carbonic gas, and simultaneously of water steam, the latter being created by the said gas passing from the flue through the washer (or water tank) and heating by its natural high temperature the water through which it passes. These currents entering by the blower, simultaneously, the chamber in which the hydrate of soda had been deposited, form now and successfully complete the transformation of the raw material into bi-carbonate of soda, as desired.

Being myself for many years past a practical manufacturer, and faithfully holding myself on a level with all the movements in the field of discoveries, novelties, improvements, and changes of my branch of science, I have in vain tried to detect any *modus operandi* which would resemble in or replace my above-described process in simplicity, effectiveness, and completeness of result, so that I consider myself justified to the hope that what I believe to be my invention, and desire to be secured by Letters Patent, will be granted to me under the following claim of—

A process of manufacturing bi-carbonate of soda, without admixture of crystal or sal soda, from hydrate of soda, and as such alone, without submitting the latter to a previous procedure, and through the simultaneous influx of carbonic gas and water steam created by said gas for the purpose and in a manner substantially as described above.

ALOIS POHR VON POHRNHOFF. [L.- S.]

Witnesses:
R. KOERBER,
L. ARNOLD.